United States Patent
Oh et al.

(10) Patent No.: US 9,354,548 B2
(45) Date of Patent: May 31, 2016

(54) POWER TRANSMITTING APPARATUS AND IMAGE FORMING APPARATUS IMPLEMENTING THE SAME

(71) Applicant: SAMSUNG ELECTRONICS CO., LTD., Suwon-si (KR)

(72) Inventors: Pil-seung Oh, Suwon-si (KR); Tae-il Jung, Suwon-si (KR); Sung-dae Kim, Suwon-si (KR); Soo-yong Kim, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/830,083

(22) Filed: Aug. 19, 2015

(65) Prior Publication Data

US 2016/0070199 A1    Mar. 10, 2016

(30) Foreign Application Priority Data

Sep. 4, 2014    (KR) .................. 10-2014-0117384

(51) Int. Cl.
| | |
|---|---|
| *G03G 15/08* | (2006.01) |
| *F16H 1/00* | (2006.01) |
| *F16H 1/20* | (2006.01) |

(52) U.S. Cl.
CPC ............ *G03G 15/0865* (2013.01); *F16H 1/003* (2013.01); *F16H 1/20* (2013.01)

(58) Field of Classification Search
USPC ......... 399/107, 110, 111, 116, 119, 120, 167, 399/252–263; 476/15, 18, 31, 64
See application file for complete search history.

(56) References Cited

U.S. PATENT DOCUMENTS

| | | | |
|---|---|---|---|
| 7,185,747 B2 | 3/2007 | Cha | |
| 8,226,206 B2 * | 7/2012 | Koga | .................. B41J 2/16547 347/37 |
| 8,873,978 B2 * | 10/2014 | Oda | .................. G03G 15/0886 399/258 |

* cited by examiner

*Primary Examiner* — Hoan Tran
(74) *Attorney, Agent, or Firm* — Staas & Halsey LLP

(57) ABSTRACT

A power transmitting apparatus includes a shaft, first and second passive members mounted on the shaft to be rotatable, and a driving member that is mounted on the shaft and rotates in connection with a driving source, and that according to a rotation direction, slides toward the first and second passive members along the shaft, so as to selectively establish a power connection with the first and second passive members.

20 Claims, 12 Drawing Sheets

POWER TRANSMITTING APPARATUS AND IMAGE FORMING APPARATUS IMPLEMENTING THE SAME

CROSS-REFERENCE TO RELATED APPLICATIONS

This application is related to, and claims the priority benefit of, Korean Patent Application No. 10-2014-0117384, filed on Sep. 4, 2014, in the Korean Intellectual Property Office, the disclosure of which is incorporated herein in its entirety by reference.

BACKGROUND

1. Field

The present disclosure relates to a power transmitting apparatus configured to transmit rotation forces in forward/reverse directions transmitted from one driving source to a plurality of passive units, respectively, and an image forming apparatus implementing the power transmitting apparatus.

2. Description of the Related Art

An apparatus, which is driven by a rotation force of a motor, such as an image forming apparatus, etc., may require a power transmission system configured to transmit rotation forces of the motor in forward and reverse directions to first and second passive bodies, respectively. The power transmission system transmits the rotation force of the motor in the forward direction to the first passive body and prevents the rotation force of the motor in the forward direction from being transmitted to the second passive body. The power transmission system transmits the rotation force of the motor in the reverse direction to the second passive body and prevents the rotation force of the motor in the reverse direction from being transmitted to the first passive body.

Examples of the power transmission system are a structure (a clutch structure) in which unidirectional bearings (or hub clutches) are arranged between a motor and two passive bodies, and a structure (a switching structure) in which swing plates rotating in forward/reverse directions according to a rotation direction of a motor are arranged between the motor and two passive bodies so that a power transmission gear mounted on the swing plate is selectively connected to the passive body in the forward direction and the passive body in the reverse direction, according to the rotation direction of the motor.

The unidirectional bearings (or the hub clutches) are generally expensive, and a control of power is performed in a passive shaft which is separate from a driving shaft, and thus, a gear train may be complicated. The switching structure is a structure in which the swing plate is rotated according to the forward/reverse rotations of the motor, and thus, an interaxial distance between the power transmission gear mounted on the swing plate and a passive gear provided in the passive body may be changed to decrease the reliability of power transmission and wear out the gear.

SUMMARY

Power transmitting apparatuses are provided having a simple structure in which rotation forces of a motor in forward and reverse directions are transmitted to a first passive body and a second passive body, respectively, and an image forming apparatus implementing the power transmitting apparatus.

Additional aspects will be set forth in part in the description that follows and, in part, will be apparent from the description, or may be learned by practice of the presented exemplary embodiments.

According to an aspect of an exemplary embodiment, a power transmitting apparatus includes a shaft, first and second passive members mounted on the shaft to be rotatable, and a driving member that is mounted on the shaft and rotatable in connection with a driving source, and which, according to a rotation direction, slidable toward one of the first and second passive members along the shaft, so as to selectively establish a power connection with the first and second passive members.

The apparatus may include a first latch unit to establish a power connection between the driving member and the first passive member when the driving member rotates in a forward direction, and to make the driving member slide toward the second passive member when the driving member rotates in a reverse direction, and a second latch unit to establish a power connection between the driving member and the second passive member when the driving member rotates in the reverse direction, and to make the driving member slide toward the first passive member when the driving member rotates in the forward direction.

The first latch unit may include a first upward slope portion, a protrusion distance of which from a first facing surface of the driving member, the first facing surface facing the first passive member, increases in the forward direction, a first driving portion that extends from a top dead portion of the first upward slope portion toward the first facing surface, a first downward slope portion, a protrusion distance of which from a second facing surface of the first passive member, the second facing surface facing the driving member, increases in the reverse direction, and a first passive portion that extends from a top dead portion of the first downward slope portion toward the second facing surface, and which faces the first driving portion when the driving member rotates in the forward direction.

When the driving member may rotate in the forward direction, the first driving portion and the first passive portion may be interlocked with each other to generate a force in a direction in which the driving member slides toward the first passive member.

The first driving portion and the first passive portion may have undercut shapes with respect to the shaft.

A slope angle of the first driving portion with respect to the first facing surface and a slope angle of the first passive portion with respect to the second facing surface may be less than 90°.

At least one of the top dead portion of the first upward slope portion and the top dead portion of the first downward slope portion may have an edge shape.

The second latch unit may include a second upward slope portion, a protrusion distance of which from a third facing surface of the driving member, the third facing surface facing the second passive member, increases in the reverse direction, a second driving portion that extends from a top dead portion of the second upward slope portion toward the third facing surface, a second downward slope portion, a protrusion distance of which from a fourth facing surface of the second passive member, the fourth facing surface facing the driving member, increases in the forward direction, and a second passive portion that extends from a top dead portion of the second downward slope portion toward the fourth facing surface, and that faces the second driving portion when the driving member rotates in the reverse direction.

When the driving member rotates in the reverse direction, the second driving portion and the second passive portion may be interlocked with each other to generate a force in a direction in which the driving member slides toward the second passive member.

The second driving portion and the second passive portion may have undercut shapes with respect to the shaft.

A slope angle of the second driving portion with respect to the third facing surface and a slope angle of the second passive portion with respect to the fourth facing surface may be less than 90°.

At least one of the top dead portion of the second upward slope portion and the top dead portion of the second downward slope portion may have an edge shape.

According to an aspect of an exemplary embodiment, an image forming apparatus includes a developing unit including a photosensitive body, a toner cartridge to accommodate a toner, a first conveyance member configured to supply the toner of the toner cartridge to the developing unit, a driving source, and a power transmitting apparatus, wherein the first conveyance member is connected with the first passive member such that the first conveyance member and the first passive member rotate in the same direction, and the first conveyance member is connected with the second passive member such that the first conveyance member and the second passive member the rotatable in opposite directions.

A first pulley may be provided in the first passive member and a second pulley, which is connected to the first pulley by a belt, is provided on a rotation shaft of the first conveyance member so that the first conveyance member is rotatable in the same direction as the first passive member.

A first gear may be provided in the second passive member and a second gear interlocking with the first gear is provided on the rotation shaft of the first conveyance member so that the first conveyance member and the second passive member is rotatable in opposite directions.

The apparatus may include a first buffer unit that is connected with the toner cartridge and receives the toner, and a second buffer unit that is connected with the first buffer unit and the developing unit. The first conveyance member may be mounted in the first buffer unit to convey the toner to the second buffer unit, a second conveyance member may be mounted in the second buffer unit to convey the toner to the developing unit, and the driving source may be connected with the second conveyance member via a unidirectional clutch unit

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
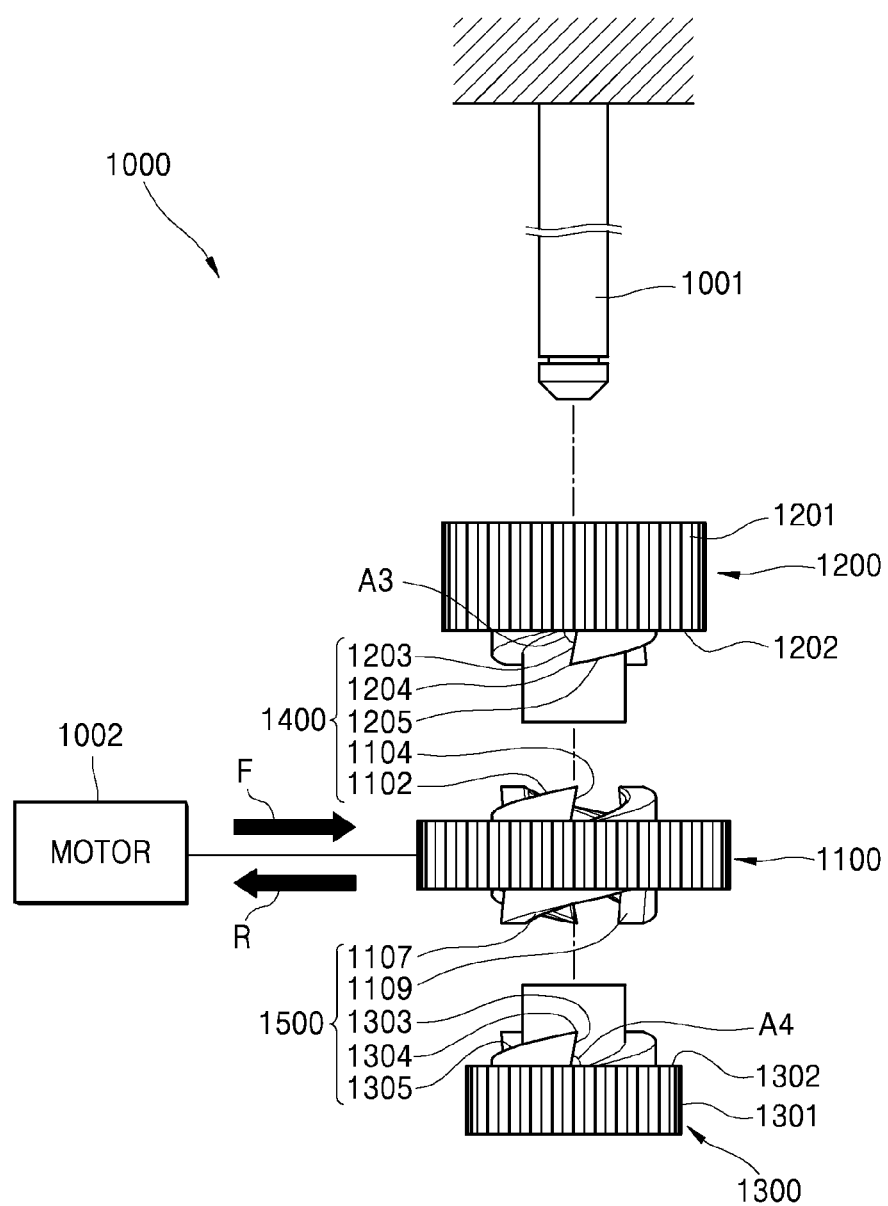
FIG. 1 is an exploded perspective view of a power transmitting apparatus according to an exemplary embodiment.

Reference is made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Exemplary embodiments of a power transmitting apparatus and an image forming apparatus will be described by referring to the accompanying drawings.

Figure 2:
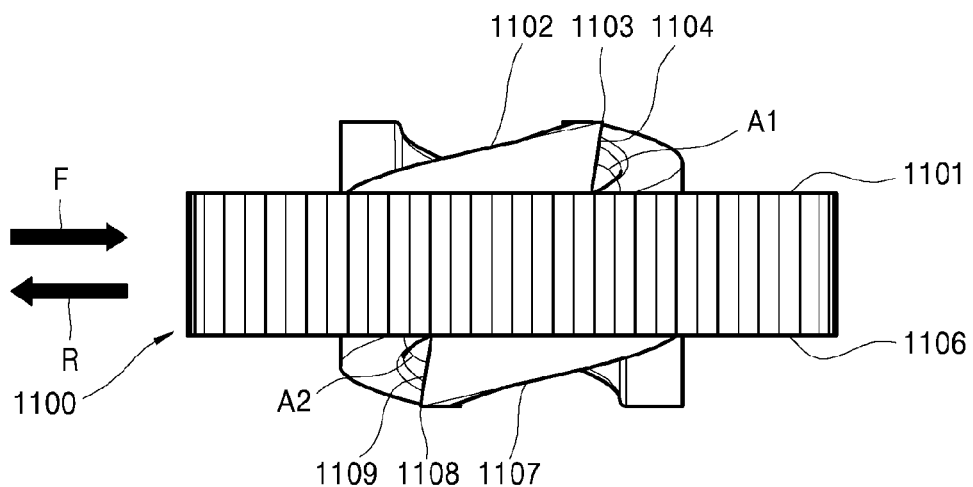
FIG. 2 is an exemplary side view of a driving gear.

FIG. 1 is an exploded perspective view of a power transmitting apparatus 1000 according to an exemplary embodiment. FIG. 2 is an exemplary side view of a driving gear 1100.

Referring to FIG. 1, the power transmitting apparatus 1000 includes the driving gear 1100, and first and second passive members 1200 and 1300. The driving member 1100 and the first and second passive members 1200 and 1300 are mountable on a shaft 1001 to be rotatable. The driving member 1100 may be arranged between the first and second passive members 1200 and 1300. The driving member 1100 is rotatable while being connected to a driving source, for example, a motor 1002. According to an exemplary embodiment, a driving gear may be adopted as the driving member 1100. Hereinafter, the driving member 1100 is referred to as the driving gear 1100.

The first and second passive members 1200 and 1300 may be passive bodies by themselves. The first and second passive members 1200 and 1300 may drive other first and second passive bodies that are not illustrated, respectively. The first and second passive members 1200 and 1300 may include first and second power transmission elements 1201 and 1301, respectively. The first and second power transmission elements 1201 and 1301 may be, for example, gears (see, for example, FIG. 1), belts, timing belts, and pulleys for chain driving.

The driving gear 1100 may slide along the shaft 1001 to be selectively connected with one of the first and second passive members 1200 and 1300. The driving gear 1100 selectively slides toward one of the first and second passive members 1200 and 1300 according to a rotation direction thereof, to establish a power connection with the first and second passive members 1200 and 1300. For example, when the motor 1002 rotates in a forward direction F, the driving gear 1100 may be connected to the first passive member 1200 to transmit a rotation force of the motor 1002 in the forward direction F to the first passive member 1200 When the motor 1002 rotates in a reverse direction R, the driving gear 1100 may be connected to the second passive member 1300 to transmit a rotation force of the motor 1002 in the reverse direction R to the second passive member 1300.

The power transmitting apparatus 1000 includes first and second latch units 1400 and 1500 that connect the driving gear 1100 to the first and second passive members 1200 and 1300, respectively, according to the rotation direction of the driving gear 1100. The first latch unit 1400 may establish a power connection of the driving gear 1100 and the first passive member 1200 when the driving gear 1100 rotates in the forward direction F The first latch unit 1400 makes the driving gear 1100 slide toward the second passive member 1300 when the driving gear 1100 rotates in the reverse direction R. The second latch unit 1500 may establish a power connection of the driving gear 1100 and the second passive member 1300 when the driving gear 1100 rotates in the reverse direction R. The second latch unit 1500 makes the driving gear 1100 slide toward the first passive member 1200 when the driving gear 1100 rotates in the forward direction F. Two or more first latch units and second latch units 1400 and 1500 may be provided in the rotation direction of the driving gear 1100. According to an exemplary embodiment, three first latch units and second latch units 1400 and 1500 are provided.

Referring to FIGS. 1 and 2, the first latch unit 1400 may include a first upward slope portion 1102, a protrusion height of which along a direction of the shaft 1001 increases along the forward rotation direction F, a first driving portion 1104 extending from a top dead portion 1103 of the first upward slope unit 1102 in the direction of the shaft 1001, a first passive portion 1203 that faces the first driving portion 1104 when the driving gear 1100 rotates in the forward direction F, and receives a rotation force of the driving gear 1100 from the first driving portion 1104, and a first downward slope portion 1205, a protrusion height of which along the direction of the shaft 1001 decreases along the forward rotation direction F. The first passive portion 1203 extends from a top dead portion 1204 of the first downward slope unit 1205 in the direction of the shaft 1001. For example, according to an exemplary embodiment, the first upward slope portion 1102 and the first driving portion 1104 are provided in the driving gear 1100, and the first passive portion 1203 and the first downward slope portion 1205 are provided in the first passive member 1200.

Referring to FIG. 2, the driving gear 1100 includes a first facing surface 1101 that faces the first passive member 1200. The first upward slope portion 1102 has a shape of a slope surface, and a height a height (an amount of protrusion along the direction of the shaft 1001) of which from the first facing surface 1101 that may increase along the rotation direction of the forward direction F. The first driving portion 1104 extends from the top dead portion 1103 of the first upward slope portion 1102 toward the first facing surface 1101, and is a surface that may be parallel to the shaft 1001 or forms an undercut shape with respect to the shaft 1001. In other words, a slope angle A1 of the first driving portion 1104 with respect to the first facing surface 1101 may be equal to or less than 90°.

Referring to FIG. 1, the first passive portion 1202 may be a surface of the first passive member 1200, which extends from a second facing surface 1202 facing the driving gear 1100 toward the direction of the shaft 1001 so as to face the first driving portion 1104 when the driving gear 1100 rotates in the forward direction F. The first passive portion 1203 may be a surface that is parallel to the shaft 1001 to correspond to the first driving portion 1104, or which forms an undercut shape with respect to the shaft 1001. In other words, a slope angle A3 of the first passive portion 1203 with respect to the second facing surface 1202 may be the same as the slope angle A1, that is, equal to or less than 90°. If the first downward slope portion 1205 and the first upward slope portion 1102 have a shape to push the driving gear 1100 toward the second passive member 1300 when the driving gear 1100 rotates in the reverse direction R, the first downward slope portion 1205 and the first upward slope portion 1102 do not need to have a complementary shape in which the first downward slope portion 1205 and the first upward slope portion 1102 form a complete male and female combination.

Referring to FIGS. 1 and 2, the second latch unit 1500 may include a second upward slope portion 1107, a protrusion height of which along the direction of the shaft 1001 increases along the rotation direction of the reverse direction R, a second driving portion 1109 extending from a top dead portion 1108 of the second upward slope portion 1107, a second passive portion 1303 that faces the second driving portion 1109 when the driving gear 1100 rotates in the reverse direction R, so as to be applied with a rotation force of the driving gear 1100 from the second driving portion 1109, and a second downward slope portion 1305, a protrusion height of which along the direction of the shaft 1001 decreases along the rotation direction of the reverse direction R. The second passive portion 1303 may extend from a top dead portion 1304 of the second downward slope portion 1305. For example, according to an exemplary embodiment, the second upward slope portion 1107 and the second driving portion 1109 may be provided in the driving gear 1100, and the second passive portion 1303 and the second downward slope portion 1305 may be provided in the second passive member 1300.

Referring to FIG. 2, the driving gear 1100 includes a third facing surface 1106 that faces the second passive member 1300. The second upward slope portion 1107 may have a shape of a slope surface and a height (an amount of protrusion along the direction of the shaft 1001) of which from the third facing surface 1106 may increase along the rotation direction of the reverse direction R. The second driving portion 1109 may extend from the top dead portion 1108 of the second upward slope portion 1107 toward the third facing surface 1106, and is a surface that may be parallel to the shaft 1001 or forms an undercut shape with respect to the shaft 1001. In other words, a slope angle A2 of the second driving portion 1109 with respect to the second facing surface 1106 may be equal to or less than 90°.

Referring to FIG. 1, the second passive portion 1303 may be a surface of the second passive member 1300, which extends from a fourth facing surface 1302 facing the driving gear 1100 toward the direction of the shaft 1001 so as to face the second driving portion 1109 when the driving gear 1100 rotates in the reverse direction R. The second passive portion 1303 may be a surface that may be parallel to the shaft 1001 to correspond to the second driving portion 1109, or that forms an undercut shape with respect to the shaft 1001. In other words, a slope angle A4 of the second passive portion 1303 with respect to the fourth facing surface 1302 may be the same as the slope angle A2, that is, equal to or less than 90°. If the second downward slope portion 1305 and the second upward slope portion 1107 have a shape to push the driving gear 1100 toward the first passive member 1200 when the driving gear 1100 rotates in the forward direction F, the second downward slope portion 1305 and the second upward slope portion 1107 do not need to have a complementary shape in which the second downward slope portion 1305 and the second upward slope portion 1107 form a complete male and female combination.

Figure 3:
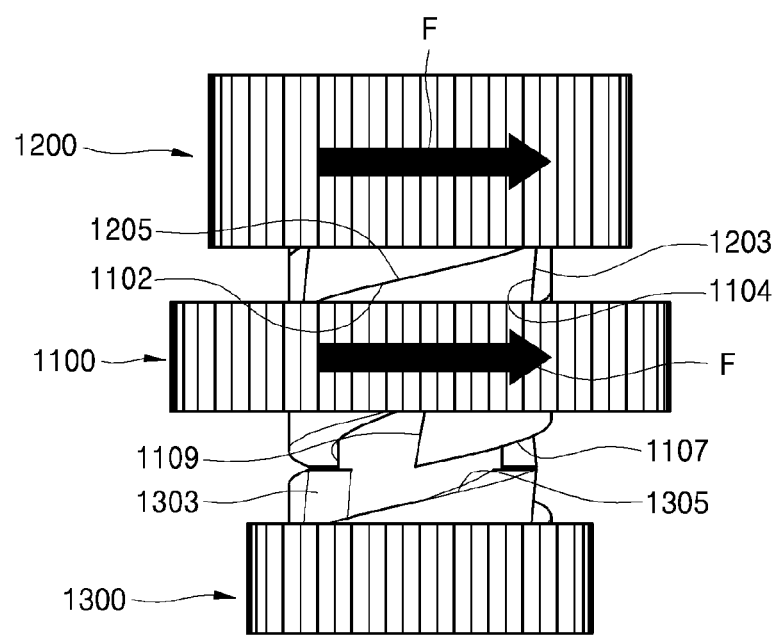
FIG. 3 is a view illustrating an exemplary state in which a driving gear and a first passive member are connected with each other.
Figure 4A:
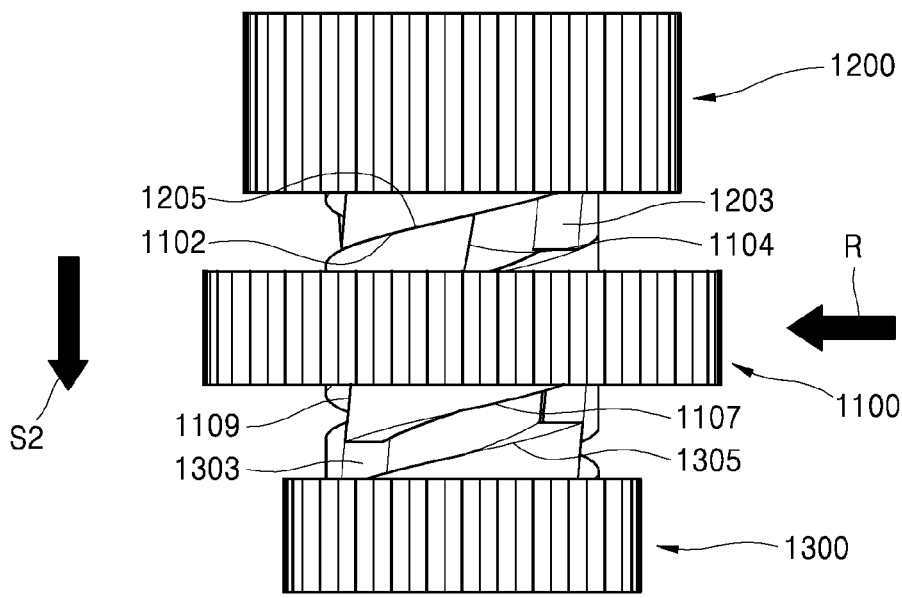
FIG. 4A is a view illustrating an exemplary process in which a driving gear slides toward a second passive member.
Figure 4B:
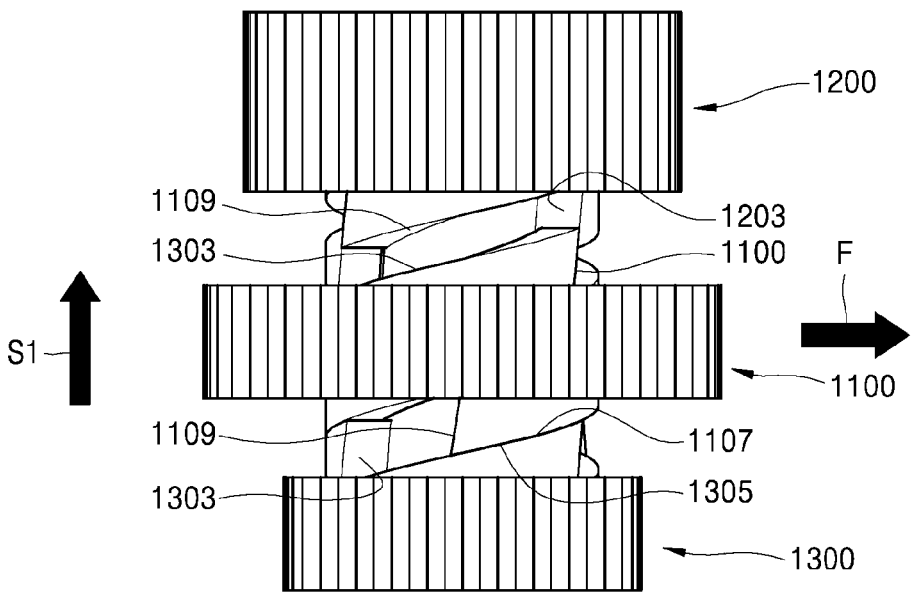
FIG. 4B is a view illustrating an exemplary process in which a driving gear slides toward a first passive member.
Figure 5:
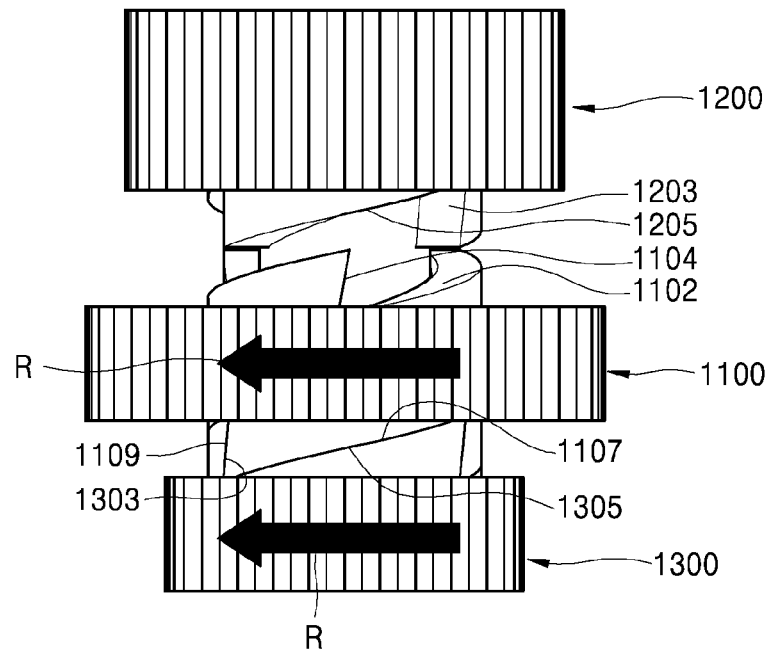
FIG. 5 is a view illustrating exemplary state in which a driving gear and a second passive member are connected with each other.

FIG. 3 is a view illustrating an exemplary state in which the driving gear 1100 and the first passive member 1200 are connected with each other. FIG. 4A is a view illustrating an exemplary process in which the driving gear 1100 slides toward the second passive member 1300. FIG. 4B is a view illustrating an exemplary process in which the driving gear 1100 slides toward the first passive member 1200. FIG. 5 is a view illustrating an exemplary state in which the driving gear 1100 and the second passive member 1300 are connected with each other. An exemplary process of transmitting power via the power transmitting apparatus 1000 of FIGS. 1 and 2 is described with reference to FIGS. 1 through 5.

Referring to FIG. 3, the driving gear 1100 may be connected to the first passive member 1200. The first driving portion 1104 faces the first passive portion 1203. Thus, when the driving gear 1100 rotates in the forward direction F by the motor 1002, the first driving portion 1104 pushes the first passive portion 1203 in the forward direction F so that the first passive member 1200 rotates in the forward direction F. Since the driving gear 1100 and the second passive member 1300 are apart from each other, a rotation force of the driving gear 1100 in the forward direction F is not transmitted to the second passive member 1300.

When the driving gear 1100 rotates in the reverse direction R by the motor 1002 in a state illustrated in FIG. 3, the first driving portion 1104 becomes apart from the first passive portion 1203 as illustrated in FIG. 4A. A rotation force of the driving gear 1100 in the reverse direction R is not transmitted to the first passive member 1200, and the first passive member 1200 maintains a stationary state. When the driving gear 1100 rotates in the reverse direction R while the first downward slope portion 1205 and the first upward slope portion 1102 contact each other, the driving gear 1100 may slide toward the second passive member 1300 in a direction S2.

When the driving gear 1100 rotates, e.g., continuously rotates in the reverse direction R so that the top dead portion 1204 and the top dead portion 1103 face each other, the driving gear 1100 is connected to the second passive member 1300 as illustrated in FIG. 5. The second driving portion 1109 faces the second passive portion 1303. Thus, when the driving gear 1100 rotates in the reverse direction R by the motor 1002, the second driving portion 1109 pushes the second passive portion 1303 in the reverse direction R, and the second passive member 1300 rotates in the reverse direction R. Since the driving gear 1100 and the first passive member 1200 are apart from each other, a rotation force of the driving gear 1100 in the reverse direction R is not transmitted to the first passive member 1200.

If the slope angles A2 and A4 of the second driving portion 1109 and the second passive portion 1303 becomes an acute angle that is less than 90°, when the driving gear 1100 rotates in the reverse direction R in the state illustrated in FIG. 4A to be transformed into a state illustrated in FIG. 5, the second driving portion 1109 and the second passive portion 1303 may interlock with each other so that a force to make the driving gear 1100 slide toward the second passive member 1300, that is, a force to make the driving gear 1100 slide in the direction S2, is generated. Thus, the first upward slope portion 1102 and the first downward slope portion 1205 become spaced apart e.g., smoothly spaced apart from each other so that a power connection between the driving gear 1100 and the first passive member 1200 may be smoothly separated. A power connection between the driving gear 1100 and the second passive member 1300 may be smoothly established.

When the driving gear 1100 rotates again in the forward direction F by the motor 1002 in the state illustrated in FIG. 5, the second driving portion 1109 becomes spaced apart from the second passive portion 1303 as illustrated in FIG. 4B. A rotation force of the driving gear 1100 in the forward direction F is not transmitted to the second passive member 1300, and the second passive member 1300 maintains a stationary state. When the driving gear 1100 rotates in the forward direction F while the second downward slope portion 1305 and the second upward slope portion 1107 contact each other, the driving gear 1100 slides toward the first passive member 1200 in a direction S1. When the driving gear 1100 rotates, e.g., continuously rotates in the forward direction F so that the top dead portion 1304 and the top dead portion 1108 face each other, the driving gear 1100 may be connected to the first passive member 1200 as illustrated in FIG. 3.

If the slope angles A1 and A3 of the first driving unit 1104 and the first passive unit 1203 become an acute angle, that is less than 90°, when the driving gear 1100 rotates in the forward direction F in the state illustrated in FIG. 4B to be transformed into the state illustrated in FIG. 3, the first driving portion 1104 and the first passive portion 1203 interlock with each other so that a force to make the driving gear 1100 slide toward the first passive member 1200, that is, a force to make the driving gear 1100 slide in the direction S1, is generated. Thus, the second upward slope unit 1107 and the second downward slope unit 1305 become naturally spaced apart from each other so that a power connection between the driving gear 1100 and the second passive member 1300 is smoothly separated. A power connection between the driving gear 1100 and the first passive member 1200 may be smoothly established.

Figure 6:
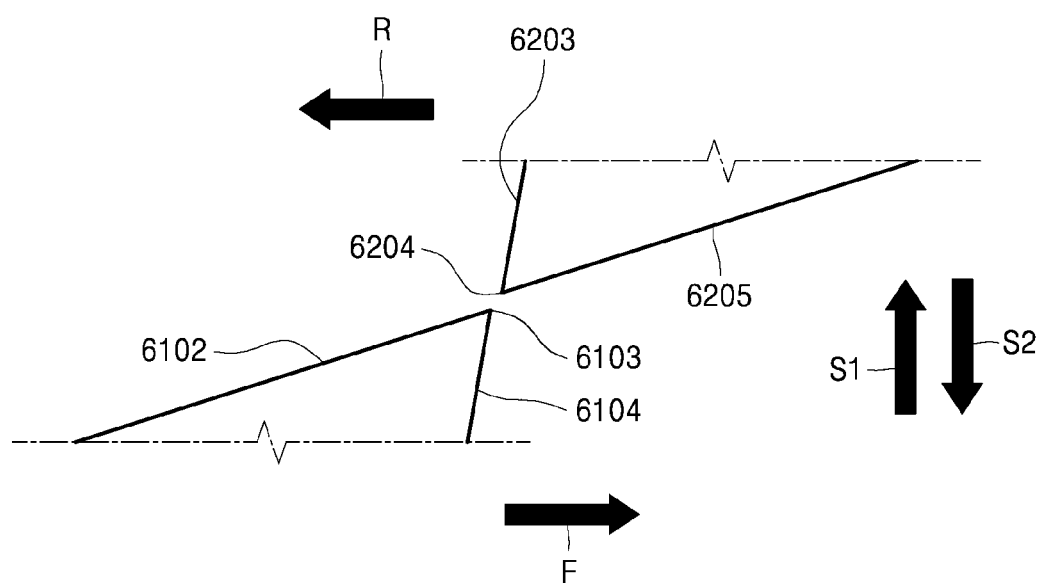
FIG. 6 is a view of an example of a shape of a top dead portion.

FIG. 6 is a view illustrating an example of a shape of the top dead portion 6103, e.g., top dead portions 1103 and 1304 and top dead portion 6204 e.g., top dead portions 1108 and 1204. Referring to FIG. 6, when the driving gear 1100 slides toward the first passive member 1200 in the direction S1 by the interaction of the second upward slope portion 1107 and the second downward slope portion 6102, e.g., second downward slope portion 1305 that is generated as the driving gear 1100 rotates in the forward direction F, the top dead portion 6103, e.g., top dead portion 1103 and the top dead portion 6204, e.g., top dead portion 1204 may meet. If both of the top dead portion 6103, e.g. top dead portion 1103 and the top dead portion 6204, e.g., top dead portion 1204 are flat surfaces crossing the shaft 1101 at right angles, surfaces of the top dead portion 6103, e.g., top dead portion 1103 and the top dead portion 6204, e.g., top dead portion 1204 contact each other so that the driving gear 1100 cannot slide in the direction S1. The second upward slope portion 6205, e.g., second upward slope portion 1107 and the second downward slope portion 6102, e.g., second downward slope portion 1305 may pressurize, e.g., continuously pressurize the driving gear 1100 in the direction S1, and thus, the driving gear 1100 becomes jammed between the second passive member 1300 and the first passive member 1200 so as not to be able to rotate, which may cause an operational defect, such as a stall of the motor 1002. These phenomena may be favorably addressed if at least one of the top dead portion 1103 and the top dead portion 1204 is formed as a sharp edge shape so that the top dead portion 1103 and the top dead portion 1204 do not form a surface-to-surface contact. That is, if the top dead portion 6103, e.g. top dead portion 1103 and the top dead portion 6204, e.g., top dead portion 1204 form linear contacts or point contacts, the second upward slope portion 6205, e.g., second upward slope portion 1107 and the second downward slope portion 6102, e.g., second downward slope portion 1305 may pressurize the driving gear 1100 in the direction S1, and thus, the top dead portion 6103, e.g., top dead portion 1103 and/or the top dead portion 6204, e.g., top dead portion 1204 are/is guided along the first downward slope portion 1205 and/or the first upward slope portion 1102 so that the driving gear 1100 may smoothly slide in the direction S1.

As illustrated in FIG. 6, at least one of the top dead portion 6204, e.g., top dead portion 1108 and the top dead portion 6103 e.g., top dead portion 1304 may be formed as a sharp edge shape. Thus, when the first upward slope portion 6102, e.g., first upward slope portion 1102 and the first downward slope portion 1205 pressurize the driving gear 1101 in the direction S2 when the driving gear 1100 rotates in the reverse direction R, the top dead portion 1108 and/or the top dead portion 1304 are/is guided along the second downward slope portion 1305 and/or the second upward slope portion 1107, and thus, the driving gear 1100 may smoothly slide in the direction S2.

Thus, the driving gear 1100 may be rotated in the forward direction F to drive the first passive member 1200 in the forward direction F, and the driving gear 1100 may be rotated in the reverse direction R to drive the second passive member 1300 in the reverse direction R. Since the power transmitting apparatus 1000 may selectively drive the first and second passive members 1200 and 1300 by using only one shaft 1001, the structure of the power transmitting apparatus 1000 is simple, and the reliability of the power switch is excellent. Also, since a small number of components are needed for the power switch, a cost is lowered for the power transmitting apparatus 1000.

Figure 7:
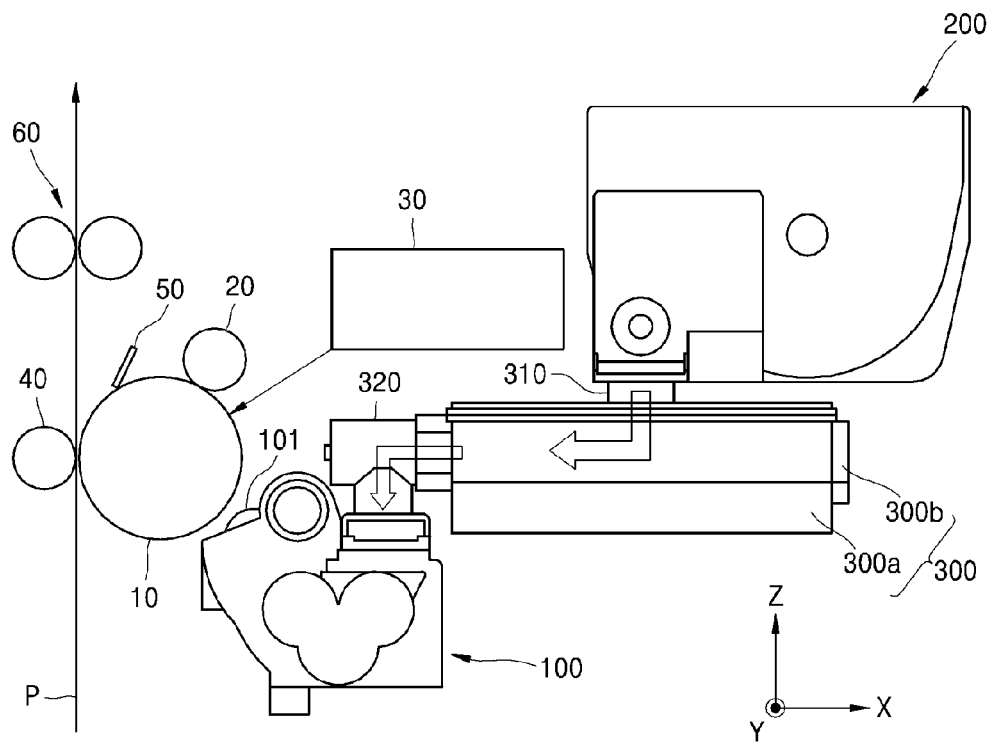
FIG. 7 is a schematic diagram of an electrophotographic image forming apparatus according to an exemplary embodiment.
Figure 8:
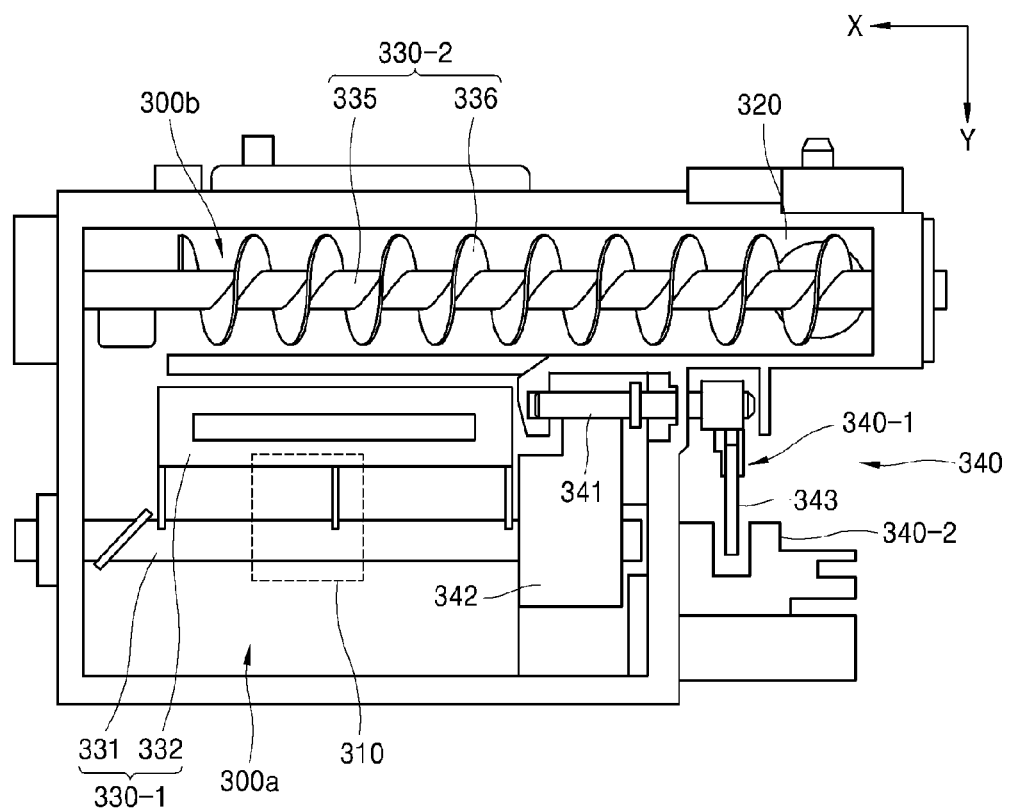
FIG. 8 is a lateral cross-sectional view of a toner buffer unit according to an exemplary embodiment.
Figure 9:
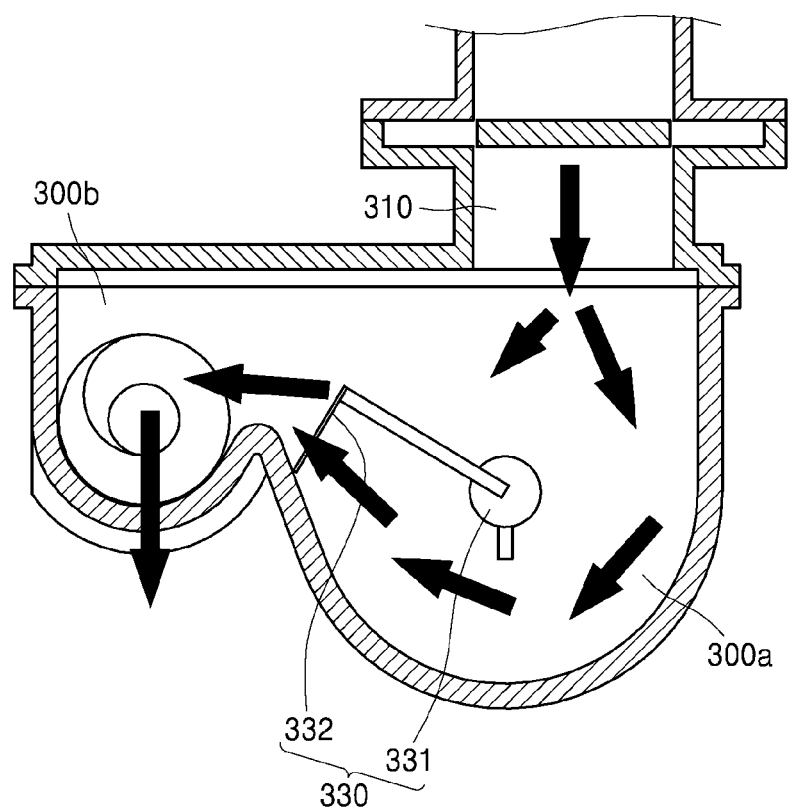
FIG. 9 is a vertical cross-sectional view of a toner buffer unit according to an exemplary embodiment.

FIG. 7 is a schematic diagram of an electrophotographic image forming apparatus according to an exemplary embodiment. FIG. 8 is a lateral cross-sectional view of a toner buffer unit 300 according to an exemplary embodiment. FIG. 9 is a vertical cross-sectional view of the toner buffer unit 300. The imaging forming apparatus according to an exemplary embodiment is a monochrome image forming apparatus. A color of the toner is, for example, black.

Referring to FIG. 7, a photosensitive drum 10 is an example of a photoreceptor, on which an electrostatic latent image is formed, and includes a photosensitive layer having a photoconductivity formed on an outer circumference of a cylindrical metal pipe. Instead of using the photosensitive drum 10, a photosensitive belt, in which a photosensitive layer is formed on an outer surface of a circulating belt, may be used.

The charging roller 20 is an example of a charger that charges a surface of the photosensitive drum 10 to a uniform charging potential. The charging roller 20 rotates while contacting the photosensitive drum 10, and a charging bias voltage is applied to the charging roller 20. A corona charger (not shown) that charges the surface of the photosensitive drum 1 by causing a corona discharge may be used, instead of the charging roller 20.

The exposing unit 30 scans light corresponding to image information onto the surface of the photosensitive drum 10 that is charged to form an electrostatic latent image. A laser scanning unit (LSU) that scans light irradiated from a laser diode onto the photosensitive drum 10 by deflecting the light in a main scanning direction by using a polygon mirror may be used as the exposing unit 30; however, exemplary embodiments are not limited thereto.

The developing unit 100 includes a developing agent. The developing unit 100 supplies a toner in the developing agent to the electrostatic latent image formed on the photosensitive drum 10 to form a visible toner image on the surface of the photosensitive drum 10.

The transfer roller 40 is an example of a transfer unit that transfers the toner image formed on the photosensitive drum 10 onto a printing medium. The transfer roller 40 faces the photosensitive drum 10 to form a transfer nip, and a transfer bias voltage may be applied to the transfer roller 40. A transfer electric field is formed between the photosensitive drum 10 and the transfer roller 40 due to the transfer bias voltage. The toner image formed on the surface of the photosensitive drum 10 is transferred onto a recording medium P by the transfer electric field that is formed in a transfer nip. A coroner transfer unit using a corona discharge may be used instead of the transfer roller 40.

The toner remaining on the surface of the photosensitive drum 10 after the transfer is removed by a cleaning member 50. The cleaning member 50 may, for example, be a blade, an end portion of which contacts the surface of the photosensitive drum 10, or a roller or a brush that rotates while contacting the photosensitive drum 10.

The toner image transferred onto the recording medium P may be attached to the recording medium P by an electrostatic force. A fusing unit 60 fuses the toner image on the recording medium P by applying heat and pressure onto the toner image.

The developing unit 100 supplies toner contained therein to an electrostatic latent image formed on the photosensitive drum 10 to develop the electrostatic latent image into a visible toner image. When a one-component development method is used, toner may be contained in the developing unit 100, and when a two-component development method is used, toner and a carrier are contained in the developing unit 100. A development roller 101 may be used to supply the toner in the developing unit 100 to the photosensitive drum 10. A development bias voltage may be applied to the development roller 101.

The one-component development method may be classified into a contact development method, wherein the development roller 101 and the photosensitive drum 10 are rotated while contacting each other, and a non-contact development method, wherein the development roller 101 and the photosensitive drum 10 are rotated by being spaced apart from each other by tens to hundreds of microns.

When a two-component development method is used, the development roller 101 may be spaced apart from the photosensitive drum 10 by tens to hundreds of microns. Although not illustrated, the development roller 101 may have a structure wherein a magnetic roller is disposed in a hollow cylindrical sleeve. The toner may be adhered to a surface of a magnetic carrier. The magnetic carrier may be adhered to the surface of the development roller 101 to be transferred to the development region where the photosensitive drum 10 and the development roller 101 face each other. Only the toner is supplied to the photosensitive drum 10 according to the development bias voltage applied between the development roller 101 and the photosensitive drum 10, and thus the electrostatic latent image formed on the surface of the photosensitive drum 10 is developed into the visible toner image The developing unit 100 may include a transport agitator (not shown) for mixing and stirring the toner and a carrier and transporting the mixture to the development roller 101. The transport agitator may be an auger, and a plurality of the transport agitators may be prepared in the developing unit 100.

Toner contained in a toner cartridge 200 may be supplied to the developing unit 100. When the toner contained in the toner cartridge 200 is consumed, the toner cartridge 200 may be replaced by a new toner cartridge 200 or new toner may be charged in the toner cartridge 200. A toner level detection unit that detects the remaining amount of toner in the toner cartridge 200 may be used. When the toner level detection unit is provided in the toner cartridge 200, a printing operation is available only when the toner cartridge 200 is replaced after it is detected that the toner in the toner cartridge 200 is all consumed. Thus, until the toner consumption state is identified and a new toner cartridge is purchased, the printing operation may not be performed.

To address this inconvenience and to stably supply toner to the developing unit 100, a toner buffer unit 300 temporarily containing the toner may be prepared between the toner cartridge 200 and the developing unit 100. The toner buffer unit 300 receives the toner from the toner cartridge 200, contains a predetermined amount of toner, and again transports the contained toner to the developing unit 100. A toner level detection unit may be provided in the toner buffer unit 300. According to this configuration, even if the toner in the toner cartridge 200 is all consumed, since a predetermined amount of toner remains in the toner buffer unit 300, a printing operation is available until a new toner cartridge 200 is provided.

Referring to FIG. 7, the developing unit 100 and the toner cartridge 200 may be arranged in a width direction X, and each of the developing unit 100 and the toner cartridge 200 may have a form extending in a depth direction Y perpendicular to the width direction X. The depth direction Y is an axial direction of the photosensitive drum 10. The toner cartridge 200 may be located to be spaced apart from the developing unit 100 in the width direction X and a gravity direction Z. The toner cartridge 200 may be located above the developing unit 100 in the gravity direction Z. The toner buffer unit 300 may be located between the developing unit 100 and the toner cartridge 200 in the gravity direction Z.

Referring to FIGS. 8 and 9, the toner buffer unit 300 may extend in the width direction (a first direction) X perpendicular to the axial direction of the photosensitive drum 10 to connect the toner cartridge 200 and the developing unit 100. The toner buffer unit 300 includes a first buffer unit 300a connected to the toner cartridge 200 and a second buffer unit 300b connected to developing unit 100. The toner supplied from the toner cartridge 200 may pass through the first buffer unit 300a and the second buffer unit 300b, and may be supplied to the developing unit 100. The first buffer unit 300a and the second buffer unit 300b extend in the width direction X. The first buffer unit 300a and the second buffer unit 300b may be arranged in the depth direction (a second direction) Y that is the axial direction of the photosensitive drum 10.

Referring to FIGS. 7 through 9, the first buffer unit 300a includes a toner inflow portion 310 into which a toner inflow may be made from the toner cartridge 200, and the second buffer unit 300b includes a toner discharge portion 320 to supply the toner to the developing unit 100. According to an embodiment, the toner inflow portion 310 extends upwards from an upper surface of the first buffer unit 300a to be connected to the toner cartridge 200, and the toner discharge portion 320 extends from a side portion of the second buffer unit 300b in the width direction X and again extends downwards to be connected to the developing unit 100. The toner inflow portion 310 may be connected to a bottom portion of the toner cartridge 200, and the toner drops from the toner cartridge 200 to the first buffer unit 300a due to gravity. The toner discharge portion 320 may be connected to an upper portion of the developing unit 100, and the toner drops from the second buffer unit 300b to the developing unit 100 due to gravity.

The greater an amount of toner that is contained in the toner buffer unit 300, the more stable the printing operation until the toner cartridge 200 may be replaced after the toner contained in the toner cartridge 200 is all consumed. To limit an increase in an overall size of the image forming apparatus, there may be a need to increase the capacity of the first buffer unit 300a and the second buffer unit 300b, for example, as much as possible. The toner buffer unit 300 may be located in next to the width direction of the developing unit 100 and below the toner cartridge 200. When the second buffer unit 300b has a form extending further downwards than an upper surface of the developing unit 100, an additional device to pump up the toner contained in the second buffer unit 300b upwards against the gravity direction Z may be required. Thus, the structure of the toner buffer unit 300 may be complicated and the components and manufacturing costs may be increased. According to an exemplary embodiment, the toner discharge portion 320 may be located above the developing unit 100, and, the second buffer unit 300b may be located in above the developing unit 100 so the toner is supplied naturally to the developing unit 100 due to gravity. Since the extension of the second buffer unit 300b in the gravity direction Z may be limited by the toner cartridge 200 and the developing unit 100, the second buffer unit 300b may extend in the width direction X. However, since the second buffer unit 300b should be located between the developing unit 100 and the toner cartridge 200 in the gravity direction Z so that an area of the second buffer unit 300b in the vertical direction is small, even if the second buffer unit 300b extends in the width direction X, the effect of increasing the capacity amount of toner may be limited, compared to the first buffer unit 300a. Therefore, to increase a capacity amount of toner in the toner buffer unit 300, it may be advantageous to extend the first buffer unit 300a. Although an upward extension may be limited by the toner cartridge 200, a downward extension is not limited. Therefore, as illustrated in FIG. 8, the first buffer unit 300a may be a form extending more downwards than the second buffer unit 300b. Overall, the capacity of the first buffer unit 300a may be greater than the capacity of the second buffer unit 300b. The first buffer unit 300a may also extend in the width direction X.

Since the first buffer unit 300a may have a form extending more downwards than the second buffer unit 300b, the toner supplied from the toner cartridge 200 to be contained in the first buffer unit 300a should again be conveyed upwards against the gravity direction Z to the second buffer unit 300b and then supplied to the developing unit 100. A first conveyance member 330-1 conveying the toner to the second buffer unit 300b may be in the first buffer unit 300a.

Referring to FIGS. 8 and 9, the first conveyance member 330-1 includes a rotation shaft 331 extending in the width direction X and a conveyance wing 332 arranged at the rotation shaft 331. The conveyance wing 332 may, for example, be a flexible elastic film having a length in the width direction X and a radius direction. The conveyance wing 332 may convey the toner in the radius direction. Accordingly, when the first conveyance member 330-1 rotates, the toner contained in the first buffer unit 330a may be provided against the gravity direction Z by the conveyance wing 332 and conveyed to the second buffer unit 330b. A second conveyance member 330-2 conveying the toner to the toner discharge portion 320 may be in the second buffer unit 330b. For example, the second conveyance member 330-2 may include an auger having a spiral wing 336 formed on an outer circumference of the rotation shaft 335 extending in the width direction X. The second conveyance member 330-2 having the auger form may extend to the toner discharge portion 320. Since the first buffer unit 300a has a form extending more downwards than the second buffer unit 330b, the center of the first conveyance member 330-1, that is, the location of the rotation shaft 331 may be below the center of the second conveyance member 330-2. Accordingly, the capacity amount of toner in the toner buffer unit 300 may increase.

The toner buffer unit 300 includes a toner level detection unit 340. The toner level detection unit 340 detects the remaining amount of toner contained in the first buffer unit 300a. Referring to FIG. 8, the toner level detection unit 340 includes an elevation member 340-1 elevated according to a toner level of the first buffer unit 300a, and a sensing unit 340-2 detecting a location of the elevation member 340-1. The elevation member 340-1 includes, for example, a support shaft 341 supported by a side wall 301 of the first buffer unit 300a to be rotatable, and an elevation plate 342 extending from the support shaft 341 to an inner portion of the first buffer unit 300a to be elevated according to the toner level. The sensing unit 340-2 may directly or indirectly detect the elevation plate 342. The sensing unit 340-2 according to an exemplary embodiment detects the remaining amount of toner in the first buffer unit 300a, for example, by detecting a detection plate 343 extending from the support shaft 341 to an outer portion of the first buffer unit 300a.

The elevation plate 342 may be arranged in a location in which an intervention with the conveyance wing 332 does not occur. For example, the elevation plate 342 may be located to be spaced apart from the conveyance wing 332 in an axial direction of the rotation shaft 331. When the elevation plate 342 is elevated according to the toner level, the rotation shaft 341 rotates and the detection plate 343 may also be elevated. The sensing unit 340-2 detects the remaining amount of toner in the first buffer unit 300a by detecting the location of the detection plate 343. However, a method in which the sensing unit 340-2 detects the location of the detection plate 343 is not limited thereto. For example, the sensing unit 340-2 may detect the location of the detection plate 343 by using an optical sensor method that uses the changing of the light amount according to the location of the detection plate 343, or by using a magnetic sensor method that uses the changing of the magnetic field strength according to the location of the detection plate 343. The sensing unit 340-2 according to an exemplary embodiment detects the location of the detection plate 343 by using the optical sensor method.

The above described toner level detection unit 340 is only an example, and the scope of an inventive concept is not limited by the toner level detection unit 340 illustrated in FIG. 8. For example, the toner level may be detected by arranging a plurality of toner level sensors, which are optical sensors or magnetic sensors, at a plurality of locations of the first buffer unit 300a, and calculating the average of detection values of the plurality of toner level sensors. To address a phenomenon where the elevation plate 342 may be buried by the toner so that a toner level of the first buffer unit 340 is not reflected, the elevation plate 342 may be periodically elevated by using an eccentric cam (not shown) provided in the first conveyance member 330-1. A sensing unit 340-2 may detect the toner level of the first buffer unit 300a by detecting a change of a detection signal of the elevation member 340-1 during the rotation period of the first conveyance member 330-1.

In a case where there is no need to supply the toner to the developing unit 100 but there may be a need to supply the toner to the second buffer unit 300b from the first buffer unit 330a, only the first conveyance member 330-1 may be driven and the second conveyance member 330-2 may not be driven (a first driving mode). When the toner is supplied to the developing unit 100, the first and second conveyance members 330-1 and 330-2 may be simultaneously driven (a second driving mode). That is, the first conveyance member 330-1 conveys the toner to the second buffer unit 330b from the first buffer unit 330a, and the second conveyance member 330-2 conveys the toner to the developing unit 100 from the second buffer unit 330b. In both cases, the first conveyance member 330-1 has to rotate in the same rotation direction. Hereinafter, an example of a driving structure for realizing the first and second driving modes will be described.

Figure 10:
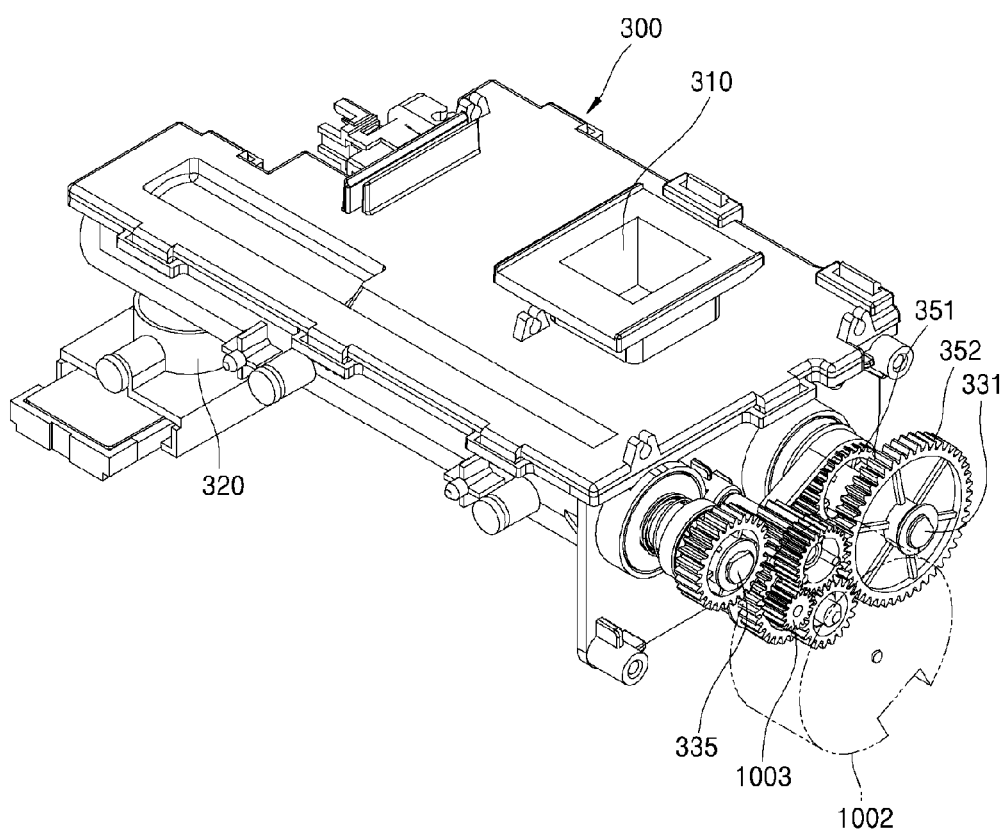
FIG. 10 is a perspective view of an example of a driving structure configured to drive a first conveyance member.
Figure 11:
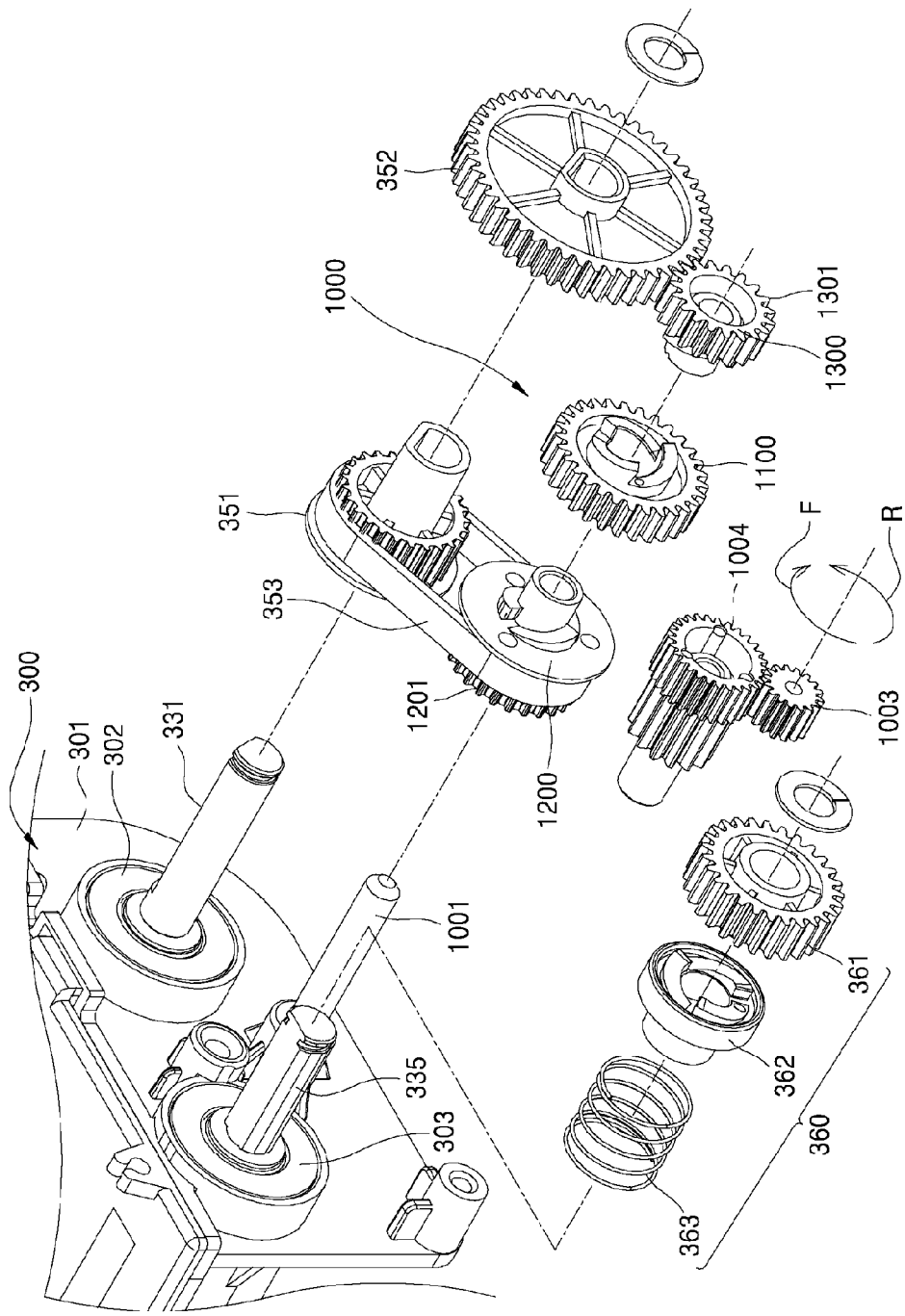
FIG. 11 is an exemplary partial exploded perspective view of FIG. 10.

FIG. 10 is a perspective view illustrating an example of a driving structure for driving the first and second conveyance members 330-1 and 330-2, and FIG. 11 is a partial exploded perspective view of FIG. 10.

FIGS. 10 and 11 illustrate the motor 1002 capable of providing a rotation force to the first and second conveyance members 330-1 and 330-2, the power transmitting apparatus 1000 including the driving gear 1100, and a unidirectional clutch unit 360 including a clutch gear 361. The motor 1002 may be connected with the driving gear 1100 and the clutch gear 361. For example, a gear 1003 provided in the motor 1002 rotates a reduction gear 1004, and the reduction gear 1004 may be connected to the driving gear 1100 and the clutch gear 361. The rotation shafts 331 and 335 of the first and second conveyance members 330-1 and 330-2 may be supported by a side wall 301 of the buffer unit 300 with bearing members 302 and 303 interposed between the side wall 301 of the buffer unit 300 and the first and second conveyance member 330-1 and 330-2, and the rotation shafts 331 and 335 protrude from the side wall 301.

The unidirectional clutch unit 360 transmitting only a unidirectional rotation force of the motor 1002 to the second conveyance member 330-2 may be arranged on the rotation shaft 335 of the second conveyance member 330-2. When, for example, the motor 1002 rotates in the forward direction F, the unidirectional clutch unit 360 transmits the rotation force of the motor 1002 to the second conveyance member 330-2, and when the motor 1002 rotates in the reverse direction R, the unidirectional clutch unit 360 blocks the rotation force of the motor 1002. The unidirectional clutch unit 360 may have various structures.

Figure 12:
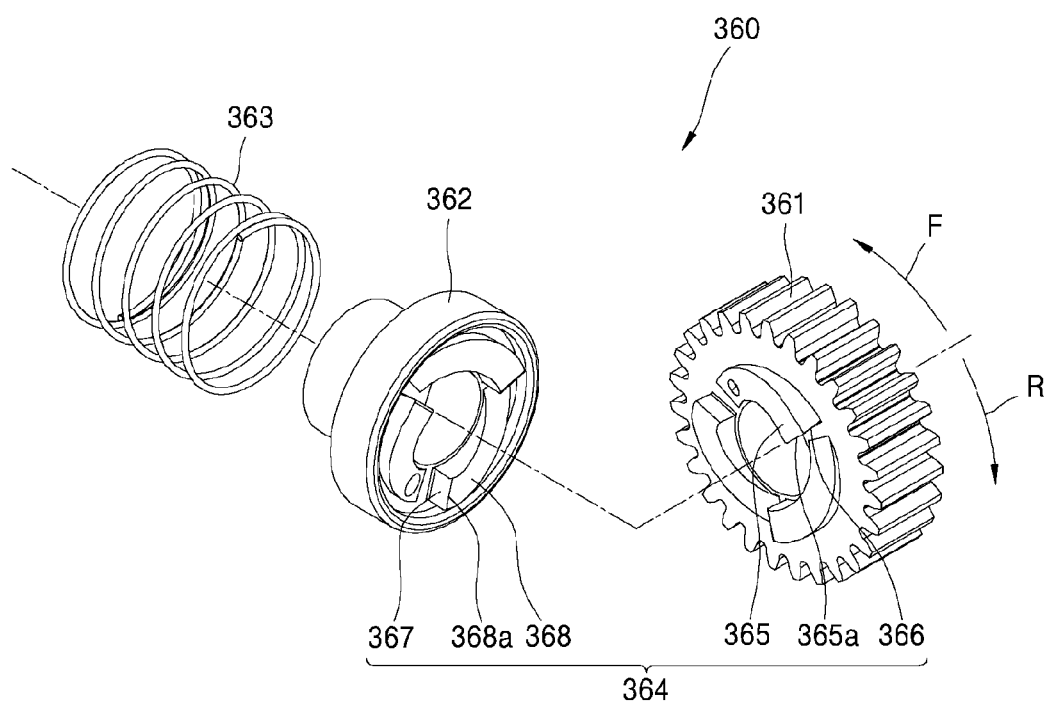
FIG. 12 is an exploded perspective view illustrating an example of a unidirectional clutch unit.

FIG. 12 is an exploded perspective view illustrating an example of the unidirectional clutch unit 360.

FIGS. 10 and 12 illustrate the clutch gear 361 coupled to the rotation shaft 335 of the second conveyance member 330-2 to be rotatable, a sliding latch 362 mounted on the rotation shaft 335 to be slidable in the shaft direction and rotating together with the rotation shaft 335, and an elastic member 363 pushing the sliding latch 362 toward the clutch gear 361. A latch unit 364 configured to transmit only a rotation force of the clutch gear 361 in the reverse direction R to the sliding latch 362 may be arranged between the clutch gear 361 and the sliding latch 362. A structure of the latch unit 364 may be the same as the structure of the second latch unit 1500 described above. For example, the latch unit 364 may have a structure in which an upward slope a side wall 301 of the buffer unit 300 365, a protrusion height of which along a direction of the rotation shaft 335 increases along the rotation direction of the reverse direction R, and a driving portion 366 extending from a top dead portion 365a of the upward slope portion 365 are formed in the clutch gear 361, and a passive portion 367 that faces the driving portion 366 when the clutch gear 361 rotates in the reverse direction R and receives the rotation force of the clutch gear 361 from the driving portion 366, and a downward slope portion 368, a protrusion height of which along the direction of the rotation shaft 335 decreases along the rotation direction of the reverse direction R are formed in the sliding latch 362. The passive portion 367 extends from a top dead portion 368a of the downward slope portion 368. An angle formed by the driving portion 366 and a line crossing the rotation shaft 335 of at right angle and an angle formed by the passive portion 367 and the line may be equal to or less than 90°. The top dead portions 365a and 368a may have a shape in which the top dead portions 365a and 368a do not form a surface-to-surface contact.

When the clutch gear 361 rotates in the forward direction F, the sliding latch 362 slides toward a direction in which the sliding latch 362 gets distanced from the clutch gear 361 by the upward slope portion 365 and the downward slope portion 368. Thus, the rotation force of the clutch gear 361 is not transmitted to the sliding latch 362 so that the second conveyance member 330-2 does not rotate. When the clutch gear 361 rotates in the reverse direction R, the sliding latch 362 slides toward the clutch gear 361 due to an elastic force of the elastic member 363, and thus, the driving portion 366 and the passive portion 367 come to face each other so that the rotation force of the clutch gear 361 is transmitted to the sliding latch 362 and the second conveyance member 330-2 rotates in the reverse direction R.

A structure of the power transmitting apparatus 1000 is the same as the structure described in FIGS. 1 through 6, and thus, like reference numerals are used. The shaft 1001 may be disposed on the side wall 301. The first passive member 1200, the driving gear 1100, and the second passive member 1300 may be formed on the shaft 1001 to be rotatable. The first latch unit (1400 of FIG. 1) may be disposed between the first passive member 1200 and the driving gear 1100, and the second latch unit (1500 of FIG. 1) is disposed between the driving gear 1100 and the second passive member 1300.

The first passive member 1200 and the second passive member 1300 may be connected to the first conveyance member 330-1. The first passive member 1200 and the first conveyance member 330-1 may be connected to each other such that the first passive member 1200 and the first conveyance member 330-1 rotate in the same direction. For example, the first passive member 1200 includes a first pulley as the power transmission element 1201, and a second pulley 351 is coupled to the rotation shaft 331 of the first conveyance member 330-1. The first and second pulleys 1201 and 351 may be connected to each other by a belt 353. Accordingly, the first passive member 1200 and the first conveyance member 330-1 rotate in the same direction.

The second passive member 1300 and the first conveyance member 330-1 may be connected to each other such that the second passive member 1300 and the first conveyance member 330-1 rotate in opposite directions. The second passive member 1300 includes a first gear as the power transmission element 1301 and a second gear 352 connected to the first gear is coupled to the rotation shaft 331 of the first conveyance member 330-1. The second pulley 351 and the second gear 352 may be fixed on the rotation shaft 331 to rotate the first conveyance member 330-1. Accordingly, the second passive member 1300 and the first conveyance member 330-1 rotate in opposite directions.

Structures of the driving gear 1100, the first and second passive members 1200 and 1300, and the first and second latch units 1400 and 1500 are the same as the structures described in FIGS. 1 through 6, and thus, their descriptions will not be repeated.

Figure 13:
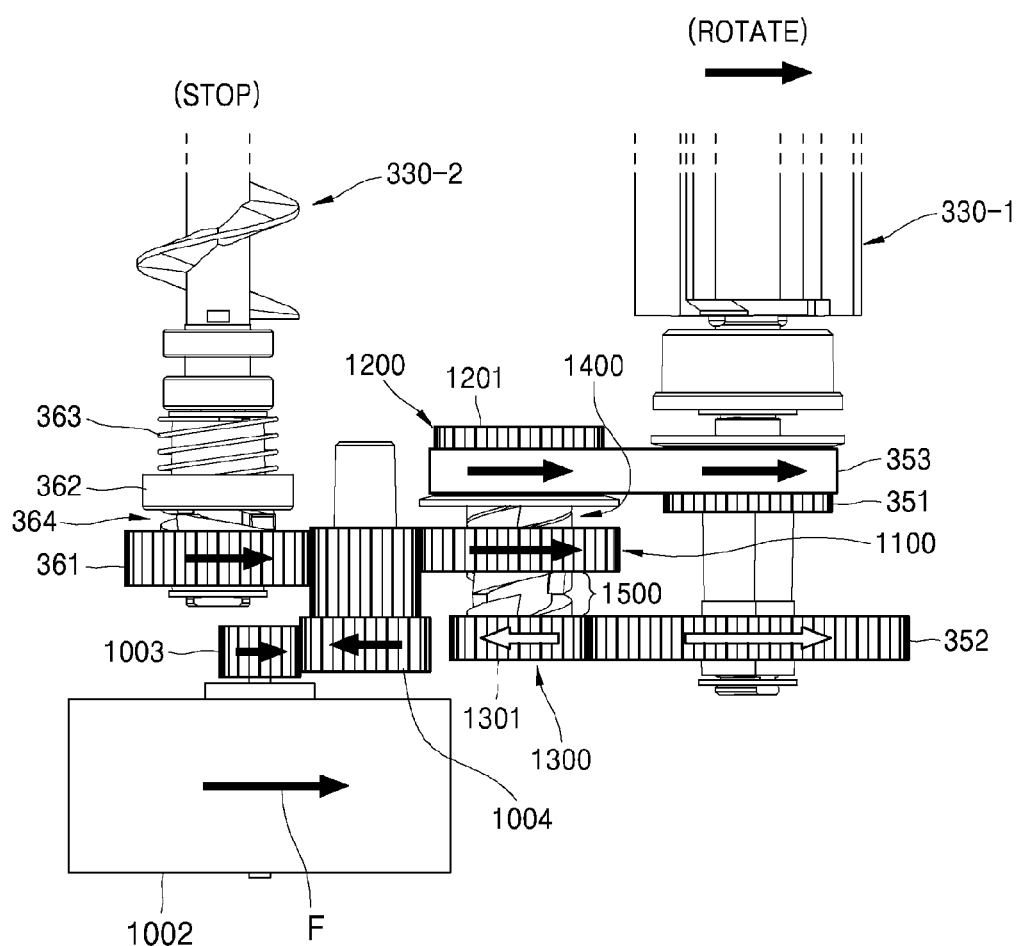
FIG. 13 is a view illustrating an exemplary shape (a first driving mode) in which a first conveyance member is driven and a second conveyance member is not driven.
Figure 14:
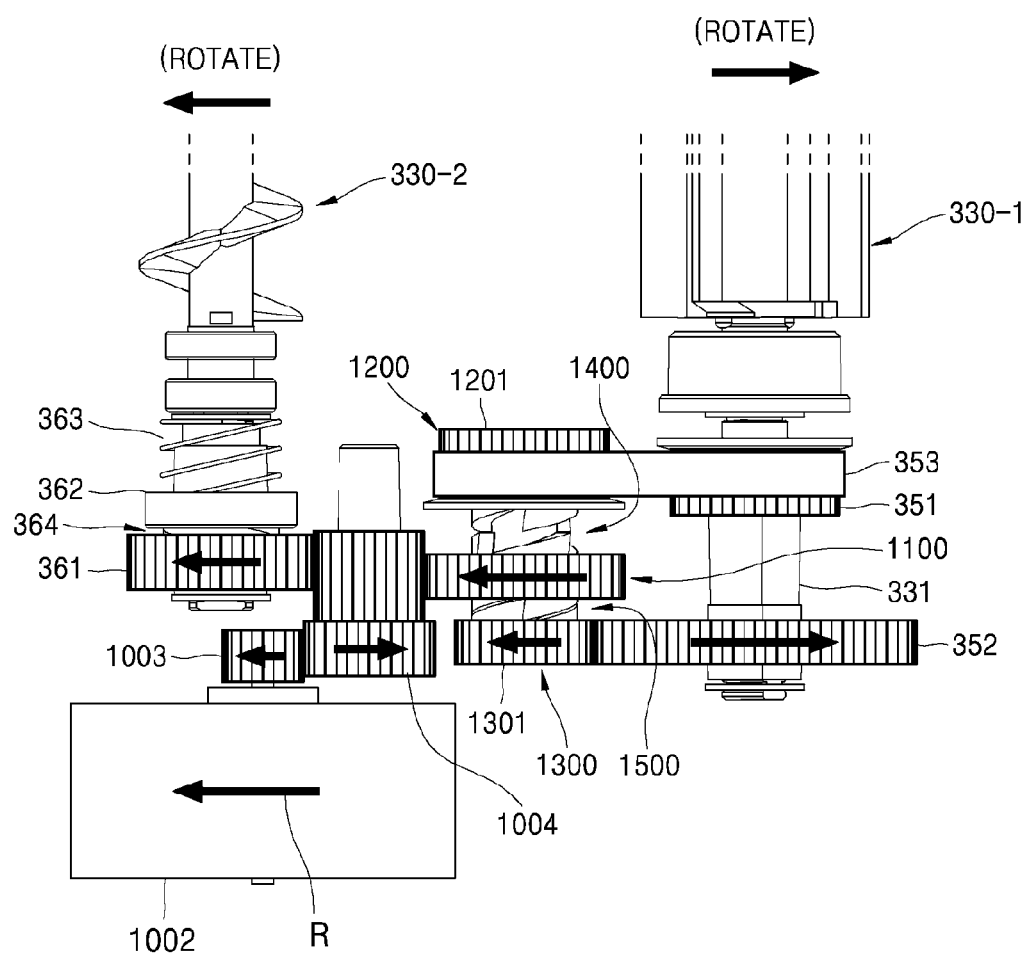
FIG. 14 is a view illustrating an exemplary shape (a second driving mode) in which a first conveyance member and a second conveyance member are simultaneously driven.

FIG. 13 is a view illustrating a shape in which the first conveyance member 330-1 is driven and the second conveyance member 330-2 is not driven. FIG. 14 is a view illustrating a shape in which the first and second conveyance members 330-1 and 330-2 are simultaneously driven. Referring to FIGS. 13 and 14, an exemplary process of driving the first and second conveyance members 330-1 and 330-2 will be described.

<The First Driving Mode>

In the first driving mode, the first conveyance member 330-1 rotates, and the second conveyance member 330-2 does not rotate. The motor 1002 rotates in the forward direction F. The driving gear 1100 and the clutch gear 361 connected to the motor 1002 also rotate in the forward direction F.

Referring to FIG. 13, the driving gear 1100 slides toward the first passive member 1200 to be connected to the first passive member 1200. The first driving portion 1104 faces the first passive portion 1203. Thus, when the driving gear 1100 rotates in the forward direction F by the motor 1002, the first driving portion 1104 pushes the first passive portion 1203 in the forward direction F, and the first passive member 1200 rotates in the forward direction F. Since the driving gear 1100 and the second passive member 1300 are apart from each other, the rotation force of the driving gear 1100 in the forward direction F is not transmitted to the second passive member 1300. Since the second pulley 351 provided in the first conveyance member 330-1 and the first pulley 1201 of the first passive member 1200 are connected to each other by the belt 353, the first conveyance member 330-1 rotates in the forward direction F which is the same as the rotation direction of the first passive member 1200. Since the second gear 352 is fixed on the rotation shaft 331 of the first conveyance member 330-1, the second gear 352 also rotates in the forward direction F, and the second passive member 1300 connected to the second gear 352 by the first gear 1301 also rotates in the forward direction F. Since the driving gear 1100 and the second passive member 1300 are apart from each other, the second passive member 1300 may rotate in the forward direction F without being interfered by the driving gear 1100.

Referring to FIG. 13, when the motor 1002 rotates in the forward direction F, the clutch gear 361 rotates in the forward direction F. The sliding latch 362 becomes distanced from the clutch gear 361 by the operation of the latch unit 364. That is, when the clutch gear 361 rotates in the forward direction F, the upward slope portion 366 pushes the downward slope portion 368 to make the sliding latch 362 slide in the opposite direction of the elastic force of the elastic member 363. Thus, a power connection between the clutch gear 361 and the sliding latch 362 is blocked, and the second conveyance member 330-2 does not rotate.

As described above, the operation of the unidirectional clutch unit 360 and the power transmitting apparatus 1000 permits the first driving mode in which the first conveyance member 300-1 rotates in the forward direction F and the second conveyance member 330-2 does not rotate.

<Second Driving Mode>

The driving gear 1100 rotates in the reverse direction R by the motor 1002 in the state illustrated in FIG. 13.

The clutch gear 361 rotates in the reverse direction R as illustrated in FIG. 14, and the sliding latch 362 slides toward the clutch gear 361 by an elastic force of the elastic member 363. That is, as the clutch gear 361 rotates in the reverse direction R, a protrusion height of the upward slope portion 366 decreases, and the sliding latch 362 slides toward the clutch gear 361 by the elastic force of the elastic member 363. When the passive portion 367 and the driving portion 366 contact each other by facing each other, the driving unit 366 pushes the passive portion 367 in the reverse direction R so that the sliding latch 362 rotates in the reverse direction R, and the second conveyance member 330-2 rotates in the reverse direction R.

A process in which the driving gear 1100 becomes distanced from the first passive member 1200 to be connected to the second passive member 1300 is the similar to that illustrated in FIG. 4A. When the driving gear 1100 rotates in the reverse direction R by the motor 1002, the first driving portion 1104 becomes distanced from the first passive portion 1203 as illustrated in FIG. 4A. The rotation force of the driving gear 1100 in the reverse direction R is not transmitted to the first passive member 1200, and the first passive member 1200 maintains a stationary state. When the driving gear 1100 rotates in the reverse direction R while the first downward slope unit 1205 and the first upward slope unit 1102 contact each other, the driving gear 1100 slides in the direction S2 toward the second passive member 1300.

When the driving gear 1100 rotates, e.g., continuously rotates in the reverse direction R so that the top dead portion 1204 and the top dead portion 1103 face each other, the driving gear 1100 is connected to the second passive member 1300 as illustrated in FIG. 14. The second driving portion 1109 faces the second passive portion 1303. Thus, when the driving gear 1100 rotates in the reverse direction R by the motor 1002, the second driving portion 1109 pushes the second passive portion 1303 in the reverse direction R, and the second passive member 1300 rotates in the reverse direction R. Since the driving gear 1100 and the first passive member 1200 are apart from each other, the rotation force of the driving gear 1100 in the reverse direction R is not transmitted to the first passive member 1200.

Since the second gear 352 provided in the first conveyance member 330-1 and the first gear 1301 of the second passive member 1300 are engaged with each other, the first conveyance member 330-1 rotates in the forward direction F that is the opposite direction of the rotation direction of the second passive member 1300. Since the pulley 351 may be fixed on the rotation shaft 331, when the first conveyance member 330-1 rotates in the forward direction F, the second pulley 351 also rotates in the forward direction F. Since the second pulley 351 is connected to the first pulley 1201 by the belt 353, the first passive member 1200 also rotates in the forward direction F. Since the driving gear 1100 and the first passive member 1200 are apart from each other, the first passive member 1200 may rotate in the forward direction F without being interfered by the driving gear 1100.

When driving gear 1100 again rotates in the forward direction F by the motor 1002 in the state illustrated in FIG. 14, the second driving portion 1109 becomes spaced apart from the second passive portion 1303 as illustrated in FIG. 4B. The rotation force of the driving gear 1100 in the forward direction F is not transmitted to the second passive member 1300 and the second passive member 1300 maintains a stationary state. When the driving gear 1100 rotates in the forward direction F while the second downward slope portion 1305 and the second upward slope portion 1107 contact each other, the driving gear 1100 slides in the direction S1 toward the first passive member 1200. When the driving gear 1100 rotates, e.g., continuously rotates in the forward direction F so that the top dead portion 1304 and the top dead portion 1108 face each other, the driving gear 1100 is connected to the first passive member 1200 as illustrated in FIG. 13.

As described above, by the operation of the unidirectional clutch unit 360 and the power transmitting apparatus 1000, the second driving mode in which the first conveyance member 300-1 rotates in the forward direction F and the second conveyance member 330-2 rotates in the reverse direction R may be realized.

If the slope angles A1 and A3 of the first driving unit 1104 and the first passive unit 1203 and the slope angles A2 and A4 of the second driving unit 1109 and the second passive unit 1303 become an acute angle that is less than 90°, when the driving gear 1100 rotates in the forward F and reverse R directions, the first driving portion 1104/the second driving portion 1109 interlock with the first passive portion 1203/the second passive portion 1303, respectively, and thus, forces that make the driving gear 1100 slide toward the first passive member 1200 and the second passive member 1300 are generated. Thus, the second upward slope portion 1107/the first upward slope portion 1102 become naturally apart from the second downward slope portion 1305/the first downward slope portion 1205, respectively, so that power connections between the driving gear 1100 and the second passive member 1300/the first passive member 1200 may be smoothly separated. When the power connections between the driving gear 1100 and the second passive member 1300/the first passive member 1200 are separated, power connections between the driving gear 1100 and the first passive member 1200/the second passive member 1300 may be smoothly established.

As described above, at least one of the top dead portion 1103 and the top dead portion 1204 and at least one of the top dead portion 1108 and the top dead portion 1304 may be formed as sharp edge shapes so that the top dead portion 1103 and the top dead portion 1204 do not form a surface-to-surface contact and the top dead portion 1108 and the top dead portion 1304 do not form a surface-to-surface contact. Accordingly, the driving gear 1100 slides, e.g., naturally slides in the direction S1 or the direction S2.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims

What is claimed is:
1. A power transmitting apparatus comprising:
a shaft;
a first passive member and a second passive member mounted on the shaft to be rotatable; and
a driving member mounted on the shaft and rotatable in connection with a driving source, and which, according to a rotation direction, slidable toward one of the first passive member and the second passive member along the shaft, so as to selectively establish a power connection with the first passive member and the second passive member.

2. The apparatus of claim 1, further comprising:
a first latch unit to establish a power connection between the driving member and the first passive member when the driving member rotates in a forward direction, and to slide the driving member toward the second passive member when the driving member rotates in a reverse direction; and
a second latch unit to establish a power connection between the driving member and the second passive member when the driving member rotates in the reverse direction, and to slide the driving member toward the first passive member when the driving member rotates in the forward direction.

3. The apparatus of claim 2, wherein the first latch unit comprises:
   a first upward slope portion, a protrusion distance of which from a first facing surface of the driving member, the first facing surface facing the first passive member, increases in the forward direction,
   a first driving portion that extends from a top dead portion of the first upward slope portion toward the first facing surface,
   a first downward slope portion, a protrusion distance of which from a second facing surface of the first passive member, the second facing surface facing the driving member, increases in the reverse direction, and
   a first passive portion that extends from a top dead portion of the first downward slope portion toward the second facing surface, and that faces the first driving portion when the driving member rotates in the forward direction.

4. The apparatus of claim 3, wherein, when the driving member rotates in the forward direction, the first driving portion and the first passive portion are interlocked with each other to generate a force in a direction in which the driving member slides toward the first passive member.

5. The apparatus of claim 4, wherein the first driving portion and the first passive portion have undercut shapes with respect to the shaft.

6. The apparatus of claim 5, wherein a slope angle of the first driving portion with respect to the first facing surface and a slope angle of the first passive portion with respect to the second facing surface are less than 90°.

7. The apparatus of claim 3, wherein at least one of the top dead portion of the first upward slope portion and the top dead portion of the first downward slope portion has an edge shape.

8. The apparatus of claim 2, wherein the second latch unit comprises:
   a second upward slope portion, a protrusion distance of which from a third facing surface of the driving member, the third facing surface facing the second passive member, increases in the reverse direction,
   a second driving portion that extends from a top dead portion of the second upward slope portion toward the third facing surface,
   a second downward slope portion, a protrusion distance of which from a fourth facing surface of the second passive member, the fourth facing surface facing the driving member, increases in the forward direction, and
   a second passive portion that extends from a top dead portion of the second downward slope portion toward the fourth facing surface, and that faces the second driving portion when the driving member rotates in the reverse direction.

9. The apparatus of claim 8, wherein, when the driving member rotates in the reverse direction, the second driving portion and the second passive portion are interlocked with each other to generate a force in a direction in which the driving member slides toward the second passive member.

10. The apparatus of claim 9, wherein the second driving portion and the second passive portion have undercut shapes with respect to the shaft.

11. The apparatus of claim 10, wherein a slope angle of the second driving portion with respect to the third facing surface and a slope angle of the second passive portion with respect to the fourth facing surface are less than 90°.

12. The apparatus of claim 8, wherein at least one of the top dead portion of the second upward slope portion and the top dead portion of the second downward slope portion has an edge shape.

13. An image forming apparatus comprising:
   a developing unit comprising a photosensitive body;
   a toner cartridge to accommodate a toner;
   a first conveyance member configured to supply the toner of the toner cartridge to the developing unit;
   a driving source; and
   a power transmitting apparatus comprising:
      a shaft,
      a first passive member and a second passive member mounted on the shaft to be rotatable, and
      a driving member mounted on the shaft and rotatable in connection with the driving source, and which, according to a rotation direction, slidable toward one of the first passive member and the second passive member along the shaft, so as to selectively establish a power connection with the first and second passive members,
   wherein upon the first conveyance member being connected with the first passive member, the first conveyance member and the first passive member are rotatable in a same direction, and upon the first conveyance member being connected with the second passive member, the first conveyance member and the second passive member are rotatable in opposite directions.

14. The apparatus of claim 13, further comprising:
   a first latch unit to establish a power connection between the driving member and the first passive member when the driving member rotates in a forward direction, and to make the driving member slide toward the second passive member when the driving member rotates in a reverse direction; and
   a second latch unit to establish a power connection between the driving member and the second passive member when the driving member rotates in the reverse direction, and to make the driving member slide toward the first passive member when the driving member rotates in the forward direction.

15. The apparatus of claim 14, wherein
   the first latch unit comprises:
      a first upward slope portion, a protrusion distance of which from a first facing surface of the driving member, the first facing surface facing the first passive member, increases in the forward direction,
      a first driving portion that extends from a top dead portion of the first upward slope portion toward the first facing surface,
      a first downward slope portion, a protrusion distance of which from a second facing surface of the first passive member, the second facing surface facing the driving member, increases in the reverse direction, and
      a first passive portion that extends from a top dead portion of the first downward slope portion toward the second facing surface, and which faces the first driving portion when the driving member rotates in the forward direction,
   wherein, when the driving member rotates in the forward direction, the first driving portion and the first passive portion are interlocked with each other to generate a force in a direction in which the driving member slides toward the first passive member,
   and the second latch unit comprises:
      a second upward slope portion, a protrusion distance of which from a third facing surface of the driving member, the third facing surface facing the second passive member, increases in the reverse direction, a second driving portion that extends from a top dead portion of the second upward slope portion toward the third facing surface, a second downward slope portion, a protrusion distance of which from a fourth facing surface of the second passive member, the fourth facing surface facing the driving member, increases in the forward direction, and a second passive portion that extends from a top dead portion of the second downward slope portion toward the fourth facing surface, and that faces the second driving portion when the driving member rotates in the reverse direction, wherein, when the driving member rotates in the reverse direction, the second driving portion and the second passive portion are interlocked with each other to generate a force in a direction in which the driving member slides toward the second passive member.

16. The apparatus of claim 15, wherein the first driving portion and the first passive portion have undercut shapes with respect to the shaft, and the second driving portion and the second passive portion have undercut shapes with respect to the shaft.

17. The apparatus of claim 15, wherein at least one of the top dead portion of the first upward slope portion and the top dead portion of the first downward slope portion has an edge shape, and at least one of the top dead portion of the second upward slope portion and the top dead portion of the second downward slope portion has an edge shape.

18. The apparatus of claim 13, wherein a first pulley is provided in the first passive member and a second pulley, which is connected to the first pulley by a belt, is provided on a rotation shaft of the first conveyance member so that the first conveyance member is rotatable in the same direction as the first passive member.

19. The apparatus of claim 18, wherein a first gear is provided in the second passive member and a second gear interlocking with the first gear is provided on the rotation shaft of the first conveyance member so that the first conveyance member and the second passive member are rotatable in opposite directions.

20. The apparatus of claim 19, further comprising:
a first buffer unit that is connected with the toner cartridge and receives the toner; and
a second buffer unit that is connected with the first buffer unit and the developing unit,
wherein:
the first conveyance member is mounted in the first buffer unit to convey the toner to the second buffer unit,
a second conveyance member is mounted in the second buffer unit to convey the toner to the developing unit, and
the driving source is connected with the second conveyance member via a unidirectional clutch unit.

* * * * *